United States Patent Office 3,766,217
Patented Oct. 16, 1973

3,766,217
ISOCYANATES CONTAINING AZIDE GROUPS
Hans Holtschmidt, Leverkusen-Steinbuechel, Heinrich Gold, Cologne-Stammheim, and Gunther Oertel, Cologne-Flittard, Germany, assignors to Bayer Aktiengesellschaft, Leverkusen, Germany
No Drawing. Continuation-in-part of abandoned application Ser. No. 549,163, May 11, 1966. This application June 18, 1971, Ser. No. 154,700
Claims priority, application Germany, May 14, 1965, F 46,057; Mar. 9, 1966, F 48,615
Int. Cl. C07c 117/00
U.S. Cl. 260—349                               6 Claims

ABSTRACT OF THE DISCLOSURE

Isocyanates containing azide groups where the azide is bonded to a hydrocarbon organic radical or hydrocarbon organic radical interrupted by acyl, ether or thioether groups and the isocyanate group is bonded directly to a carbon atom. A process for the preparation of these isocyanates which involves the phosgenation of the corresponding amines is also disclosed. The isocyanate-containing azide groups are intended to be used in preparation of light sensitive polymers and as intermediate products for the preparation of pesticides and pharmaceuticals.

CROSS-REFERENCE TO RELATED APPLICATION

This application is a continuation-in-part of copending U.S. patent application, Ser. No. 549,163, filed May 11, 1966, now abandoned.

BACKGROUND OF THE INVENTION

Heretofore, isocyanates have been prepared by reacting amines with phosgene. Several variations of this process have been described in Annalen, 562 (1949), pp. 75–136.

Also, it is known that amines which contain one or more azide groups in the molecule are very rapidly and completely decomposed by acids, especially at elevated temperatures. Consequently it would be expected that cleavage of the azide group would occur at elevated temperatures in the presence of phosgene.

It is therefore an object of this invention to provide new organic isocyanates. Another object of this invention is to provide organic isocyanates containing azide groups. Still another object of this invention is to provide a process for preparing organic isocyanates having azide groups. A further object of this invention is to provide a process for preparing organic isocyanates containing azide groups from the corresponding amines. A still further object of this invention is to provide isocyanates which may be used in the preparation of light sensitive polymers (see German Pat. 1,053,782 (1959)).

DESCRIPTION OF THE INVENTION

These and other objects which will become apparent from the following description are accomplished in accordance with the invention, generally speaking, by providing an organic isocyanate having the formula $$(N_3)_n-R-(NCO)_m$$

wherein R is an organic radical derived from a substituted or unsubstituted aliphatic, cycloaliphatic or aromatic hydrocarbon, $n$ and $m$ are integers whose sum is equal to the valance of R. Preferred compounds are those wherein R represents a radical having from 2 to 18 carbon atoms. Particularly preferred compounds represented by the aforesaid formula are those wherein R represents a member selected from the group consisting of alkylene, arylene-alkylene, alkylene-arylene, cycloalkylene-alkylene and the like.

Examples of straight and branched chain aliphatic radicals are ethylene, butylene, hexylene, octylene, decylene, dodecylene, tetradecylene, hexadecylene, octadecylene, 2-methyl hexylene, 2-ethyl octylene, 3-methyl octylene, ethylidyne, butylidyne, hexylidyne, octylidyne, dodecylidyne, tetradecylidyne, hexadecylidyne, octadecylidyne and the like. Examples of cycloaliphatic radicals are cyclopropylene, cyclohexylene, cyclo-octylene and the like. Examples of aromatic radicals are phenylene, naphthylene, anthrylene and the like. In addition, the organic radical R above may have other substituents which are inert to the phosgenation reaction. Examples of such radicals are hydrocarbon radicals such as alkyl, aryl and aralkyl radicals having from 1 to 10 carbon atoms; ether radicals, such as alkoxy and aroxy radicals having from 1 to 6 carbon atoms; thioether radicals, such as alkylmercapto and arylmercapto radicals having from 1 to 6 carbon atoms; nitrile, sulphone or ester radicals, such as carboxylic acid ester and sulphonic acid ester radicals; amide radicals, such as carbonamide and sulphonamide radicals and halogen atoms such as chlorine, bromine, fluorine and iodine.

In accordance with the process of this invention, the isocyanates can be prepared in relatively high yields by the reaction of corresponding primary mono- and poly-azido organic amines with phosgene at a temperature from about —20 to about 200° C. in the presence or absence of an organic solvent.

The starting materials for the production of the novel isocyanates of the present invention as hereinabove indicated are the corresponding amines containing azide groups. The amines can be conveniently represented by the following general formula:

$$(N_3)_n-R-(NH_2)_m$$

wherein R, $n$ and $m$ are the same as indicated above.

These starting materials can be prepared by protecting some of the amino groups in the primary polyamines, for example, diamines, by acylation and then converting the remaining amino groups by known methods into an azide group, followed by deacylation of the protected amino group in an alkaline medium.

Surprisingly, it was found that azide groups do not split under the conditions of the instant invention. Both the amines containing azide groups and the corresponding isocyanates obtained from these amines when subjected to elevated temperatures and/or the action of an acid, i.e., hydrochloric acid, are relatively stable. Generally, decomposition reactions are observed only to a very minor extent if at all under the conditions of the process of this invention, and the isocyanates containing azide groups are obtained in very good yields.

The following compounds are examples of mono- or poly-amines containing azide groups which may be employed in the formation of the corresponding isocyanates:

$NH_2-CH_2-CH_2-N_3$     $NH_2-CH-CH_2-N_3$
                                             $CH_3$ $NH_2-CH_2-CH_2-CH_2-CH_2-N_3$    $HCl-NH_2-CH_2-CH_2-OOC-CH_2-N_3$ $NH_2-CH_2-\langle\bigcirc\rangle-N_3$    $NH_2-\langle\bigcirc\rangle-CH_2-N_3$ $NH_2-CH-CH_2-\langle\bigcirc\rangle-N_3$    $NH_2-\langle\bigcirc\rangle-S-\langle\bigcirc\rangle-NH_2$
      $CH_3$                                 $N_3$ $NH_2-\langle\bigcirc\rangle-CH_2-N_3$    $HCl-NH_2-CH_2-CH_2-OOC-\langle\bigcirc\rangle-N_3$

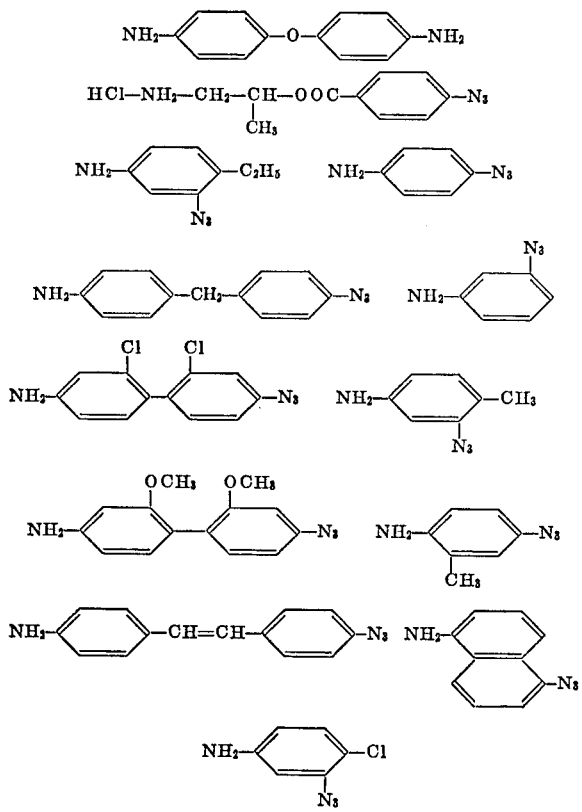

In general conversion of mono- or poly-amines containing azide groups into the corresponding isocyanates is carried out by the usual industrial methods of phosgenation, e.g., by a cold phase-hot phase phosgenation or by the hydrochloride- or carbamate process in which the corresponding amino-hydrochlorides or -carbamate are reacted with phosgene.

The process of this invention may be explained by the following formula:

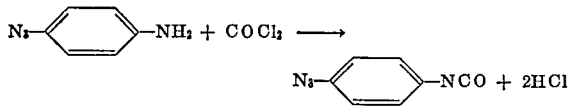

wherein 4-azidoaniline is converted into 4-azidophenylisocyanate.

The reaction conditions of the phosgenation may vary within certain limits. In general the liquid reaction medium employed in the conversion of the amines to the corresponding isocyanates must be inert to the reactants and stable under the conditions employed. Preferably hydrocarbons such as benzene, toluene, chlorobenzene or trichlorobenzene are used for the reaction medium but in special cases other solvents such as nitrobenzene or tetramethylene sulphone may also be used. In order to obtain good yields, the temperature should not be too high during phosgenation. For this reason, the cold phase-hot phase phosgenation is frequently to be preferred to the hydrochloride process since in the first case the mixture of carbamide chloride and amino hydrochloride is obtained in such a fine suspension that the hot phosgenation is quickly completed even at temperatures as low as 100°. Phosgenation can be carried out continuously or intermittently.

The reaction according to the invention is always carried out with a large excess of phosgene at temperatures between about −20 and about 200° C., preferably between about −5 and about 150° C., and preferably in one of the above-mentioned solvents.

Pressure is not necessarily critical and the instant process can be conducted at atmospheric, subatmospheric or superatmospheric pressures, although the reaction of the amines and phosgene at temperatures of from −20 to about 200° C. at atmospheric pressure gave good yields.

Inasmuch as the yield and rate of formation of isocyanates are dependent upon several variables, for example, the solubility of the amines and phosgene in the reaction medium, reaction temperature, pressure, rate of addition of phosgene, no hard and fast rule can be devised regarding the optimum conditions employed.

The new mono- and poly-isocyanates containing azide groups are distillable liquids, oils or crystalline substances depending on the type of amine used. They are intended to be used as intermediate products for the preparation of pesticides and pharmaceuticals (see Merck-Index, "Sevin," p. 933 (1960)).

DESCRIPTION OF THE PREFERRED EMBODIMENTS

The invention is further illustrated but not limited by the following examples in which all parts and percentages are by weight unless otherwise specified.

EXAMPLE 1

Preparation of

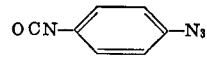

(a) Preparation of the starting material.—Approximately 272 parts of 4-formylaminoaniline are stirred with about 600 parts of water, about 200 parts of ice and about 420 parts of 35% hydrochloric acid and treated at a temperature of from 0 to about 5° with a solution containing about 140 parts of sodium nitrite in about 400 parts of water. To the diazonium salt solution obtained there is added at 0° C. a solution containing about 410 parts of potassium bromide, about 630 parts of water and about 390 parts of bromine. The precipitated orange colored compound is filtered off under suction, washed with water and introduced into about 6000 parts of 25% ammonia at a temperature of from about 0 to 5° C. The product thus formed is separated by suction filtration and stirred to a paste with about 300 parts of 40% aqueous sodium hydroxide and the paste is distilled off by the direct introduction of steam. Approximately 135 parts of a compound identified as 4-azidoaniline is shaken out of the aqueous distillate with methylene chloride, which amounts to approximately a 50% yield based on theoretical. The oily azide solidifies in the refrigerator in the form of large prisms.

$C_6H_6N_4$, molecular weight 135.14.—Calculated (percent): C, 53.72; H, 4.51; N, 41.76. Found (percent): C, 53.66; H, 4.62; N, 41.60.

(b) Process of the invention.—Approximately 109 parts of 4-azidoaniline are introduced at about 0° C. into a solution of about 150 parts of phosgene in about 800 parts by volume of toluene. The resulting suspension is stirred for about 4 hours at from 0 to about 50° C. and then gradually heated to about 70° C. while phosgene is introduced. After phosgenating for about 5 hours at 70° C. a clear pale yellow solution is obtained. Nitrogen is blown through this solution at a temperature of about 60° C. for about 3 hours to remove excess phosgene and the solution is then stirred for an additional 30 minutes at a temperature of about 50° C. while active charcoal is added and thereafter concentrated by evaporation at a reduced pressure. The oily residue is distilled in vacuo. B.P. 0.25 mm.=59–60°.

Yield: 107 parts of pale yellow oil; $n_D^{20}$=1.5919.

Analysis (molecular weight 169).—Calculated (percent): C, 52.4; H, 2.5; N, 35.0; O, 10.0; NCO, 26.3. Found (percent): C, 52.4; H, 2.7; N, 34.9; O, 10.3; NCO, 26.3.

EXAMPLE 2

Preparation of

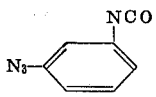

(a) Preparation of the starting material.—Approximately 360 parts of 3-oxamidoaniline are stirred in about 3500 parts of water at about 50° C. with a solution containing about 80 parts of sodium hydroxide in about 200 parts of water. About 140 parts of sodium nitrite dissolved in about 350 parts of water are then added. The resulting solution is poured into a mixture of about 450 parts of a 35% hydrochloric acid and about 1500 parts of ice while the temperature is maintained at 10° C. or less by cooling. About 420 parts of 4-methyl-benzene sulphonic acid amide dissolved in about 2000 parts of water and about 170 parts of sodium hydroxide are then added. After the mixture has been stirred for about 16 hours, it is filtered with suction and the moist paste is distilled in about 1000 parts of water and about 300 parts of sodium hydroxide by the introduction of direct steam until pure water distills over. In the aqueous distillate, 3-azidoaniline separates out as a heavy oil which on cooling solidifies as large prisms which melt at 35° C. Yield: about 160 parts, i.e., 60% of the theoretical.

(b) Process according to the invention.—Approximately 115 parts of 3-azidoaniline are introduced at about 0° C. into a solution of about 200 parts of phosgene in about 1500 parts by volume of toluene and phosgenation is then carried out as indicated in Example 1(b). The reaction product obtained is a pale yellow oil which can be distilled in vacuo. B.P. 6 mm.=73°; $n_D^{20}$=1.5913.

Yield: 99 parts of pale yellow oil; NCO content: 26.3% (calculated 26.3%).

EXAMPLE 3

Preparation of

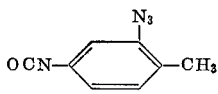

(a) Preparation of starting material.—Approximately 180 parts of 4-amino-2-azidotoluene, i.e., approximately 60% of the theoretical yield (M.P. 65°) are obtained from 388 parts of 4-oxamido-2-aminotoluene by the method described in Example 2(a).

(b) Process according to the invention.—Approximately 122 parts of 4-amino-2-azidotoluene are introduced at about 0° C. into a solution of about 150 parts of phosgene in about 800 parts by volume of toluene and reacted with phosgene in accordance with Example 1(b). A yellow, distillable oil is obtained as reaction product. B.P. 0.65 mm.=79°; $n_D^{20}$=1.5841.

Yield: 122 parts of a pale yellow oil.

Analysis (molecular weight 174).—Calculated (percent): C, 55.2; H, 3.45; N, 32.2; O, 9.2; NCO, 24.2. Found (percent): C, 55.1; H, 3.6; N, 31.5; O, 10.2; NCO, 24.3.

EXAMPLE 4

Preparation of

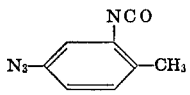

(a) Preparation of starting material.—Approximately 180 parts of 2-amino-4-azidotoluene having a melting point of about 62° are obtained from 300 parts of 2-formyl-4-aminotoluene by the method described in Example 1(a).

(b) Process according to the invention.—Approximately 54 parts of 2-amino-4-azidotoluene are introduced at about 0° C. into a solution of about 100 parts of phosgene in about 500 parts by volume of chlorobenzene. The resulting suspension is stirred for about 4 hours at about 0° C. and then slowly heated to about 90° by the introduction of phosgene. After phosgenating for about 4 hours at 90° C., a clear yellow solution is obtained. Nitrogen is blown through this solution for about 5 hours at a temperature of from about 60-70° C. to remove excess phosgene and dissolved hydrochloric acid. The solution is then concentrated by evaporation under reduced pressure. The oily residue is distilled in a high vacuum. B.P. 0.08 mm.=73-74°; $n_D^{20}$=1.5834.

Analysis (molecular weight 174).—Calculated (percent): C, 55.2; H, 3.45; N, 32.2; O, 9.2; NCO, 24.2. Found (percent): C, 55.7; H, 3.7; N, 31.3; O, 9.2; NCO, 24.9.

EXAMPLE 5

Preparation of

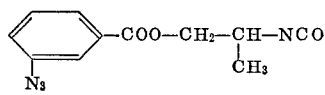

(a) Preparation of starting material.—Approximately 194 parts of m-aminobenzoic acid-2-hydroxy-propylamide are dissolved in 575 parts by volume of water and 210 parts by volume of 35% hydrochloric acid, approximately 1150 parts of ice are added and over a period of about 10 minutes a solution containing about 70 parts of sodium nitrite in about 230 parts of water is added dropwise. A solution of about 80 parts of hydroxylamine hydrochloride in about 150 parts by volume of water is then added. After about 48 hours, the resulting oil is taken up in methylene chloride and the solvent is evaporated from the methylene chloride solution in a vacuum produced by a water-jet pump. The m-azidobenzoic acid-2-hydroxy-propylamide remaining behind as a reddish oil solidifies under refrigeration to yellow prisms.

Yield: 154 parts (70% of the theoretical). M.P. 65-67°.

Approximately 101 parts of m-azidobenzoic acid-2-hydroxy-propylamide are dissolved in about 200 parts by volume of dioxane. A vigorous stream of hydrogen chloride is passed through this solution for about 2 hours at a temperature of from about 60 to about 80°. The solution is then concentrated by evaporation in vacuo. Approximately 120 parts of m-azidobenzoic acid-2-amino-propylester hydrochloride in the form of a red oil remain behind in the residue.

(b) Approximately 103 parts of m-azidobenzoic acid-2-amino-propylester hydrochloride are emulsified in about 800 parts by volume of toluene. Phosgene is passed through the emulsion for about 12 hours at a temperature of from about 80 to 90° C. Nitrogen is blown through the resulting clear, red solution at about 60° C. and the solution is then stirred for about 30 minutes while about 20 parts of active charcoal are added. It is then filtered and evaporated in vacuo leaving about 84 parts of a red oil behind in the residue. This is dissolved in about 200 parts by volume of benzene and treated with petroleum ether until it begins to become turbid, then about 10 parts of active charcoal are then added with agitation. The solution is filtered and again concentrated by evaporation in vacuo about 80 parts of m-azidobenzoic acid-2-isocyanatepropyl ester in the form of a reddish clear oil remain behind in the residue (NCO content: calculated 17.1%; found 16.5%).

Although the invention has been described in considerable detail for the purpose of illustration, it is to be understood that variations can be made by those skilled in the art without departing from the spirit of the invention and scope of the claims.

What is claimed is:
1. A compound selected from the group consisting of those of the formulae:

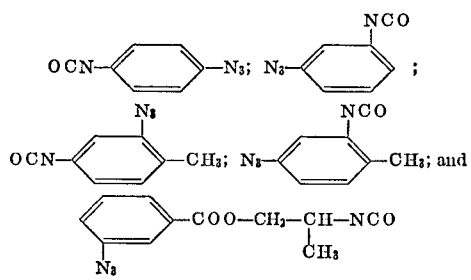

2. A compound as defined in claim 1 having the formula:

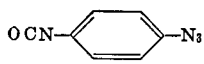

3. A compound as defined in claim 1 having the formula:

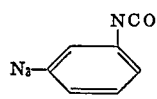

4. A compound as defined in claim 1 having the formula:

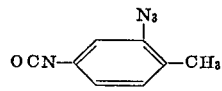

5. A compound as defined in claim 1 having the formula:

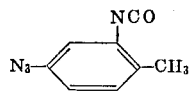

6. A compound as defined in claim 1 having the formula:

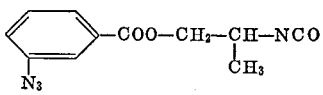

References Cited
Fuson: "Reactions of Organic Compounds," John Wiley & Sons, Inc., New York, p. 337 (1962).

JOHN M. FORD, Primary Examiner